US012421581B2

(12) United States Patent
Aumayr et al.

(10) Patent No.: US 12,421,581 B2
(45) Date of Patent: Sep. 23, 2025

(54) STEEL MATERIAL IN POWDER FORM AND PROCESS FOR PRODUCING SAID STEEL MATERIAL

(71) Applicant: Voestalpine Böhler Edelstahl GmbH & Co. KG, München (AT)

(72) Inventors: Christin Aumayr, Leoben (AT); Harald Leitner, Kindberg (AT)

(73) Assignee: voestalpine BOHLER Edelstahl GmbH & Co. KG, Kapfenberg (AT)

( * ) Notice: Subject to any disclaimer, the term of this patent is extended or adjusted under 35 U.S.C. 154(b) by 899 days.

(21) Appl. No.: 17/607,287

(22) PCT Filed: Apr. 29, 2020

(86) PCT No.: PCT/EP2020/061922
§ 371 (c)(1),
(2) Date: Oct. 28, 2021

(87) PCT Pub. No.: WO2020/221812
PCT Pub. Date: Nov. 5, 2020

(65) Prior Publication Data
US 2022/0184707 A1    Jun. 16, 2022

(30) Foreign Application Priority Data
Apr. 30, 2019   (DE) ..................... 10 2019 111 236.2

(51) Int. Cl.
C22C 38/02       (2006.01)
B22F 1/05        (2022.01)
(Continued)

(52) U.S. Cl.
CPC ............... C22C 38/02 (2013.01); B22F 1/05 (2022.01); B22F 1/052 (2022.01); B22F 10/28 (2021.01);
(Continued)

(58) Field of Classification Search
CPC ......... C22C 38/04; C22C 38/06; C22C 38/42; C22C 38/44; C22C 38/46; C22C 38/48;
(Continued)

(56) References Cited

U.S. PATENT DOCUMENTS 3,141,238 A    7/1964   Harmon, Jr.
5,980,812 A    11/1999  Lawton
(Continued)

FOREIGN PATENT DOCUMENTS

CA    2918775 A1    7/2016
CN    108274000 A   7/2018
(Continued)

OTHER PUBLICATIONS

Wei Mingwei et al., "Selective laser melting of 24CrNiMo steel for brake disc: Fabrication efficiency, microstructure, evolution, and properties", Optics and Laser Technology, Elsevier Science Publishers BV., vol. 107, May 26, 2018, pp. 99-109.
(Continued)

Primary Examiner — Lois L Zheng
(74) Attorney, Agent, or Firm — Maxwell J. Petersen; FisherBroyles, LLP

(57) ABSTRACT

The invention relates to a steel material in powder form for printing in additive manufacturing methods such as selective laser melting (SLM) or selective laser sintering (SLS) or for use in hot isostatic pressing methods, wherein the material has the following composition:
C 0.17-0.23
Si 0.10-0.80
Mn 0.15-0.45
P≤0.03
S≤0.015
Cr 0.8-2.0
Mo 0.15-0.80

(Continued)

Figure 1:
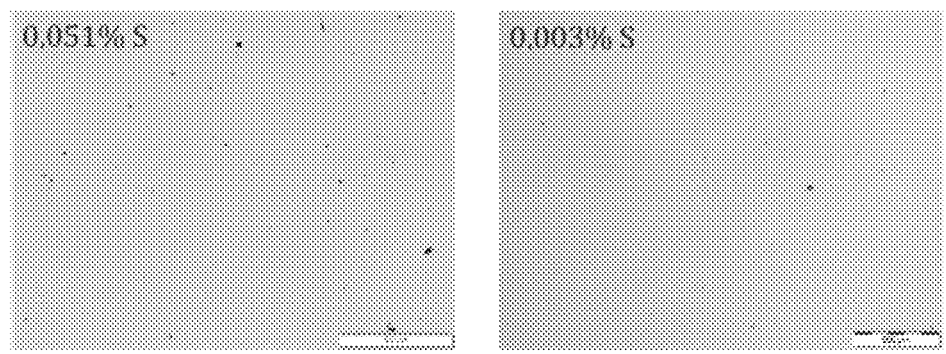

Ni 0.1-2.0
V 0.1-2.0
 the remainder being comprised of iron, optional elements, and inevitable smelting-related impurities as well as a method for manufacturing it and a method for producing a component made thereof.

18 Claims, 14 Drawing Sheets

(51) Int. Cl.
  *B22F 1/052* (2022.01)
  *B22F 10/28* (2021.01)
  *B22F 10/36* (2021.01)
  *B22F 10/64* (2021.01)
  *B23K 26/342* (2014.01)
  *B33Y 10/00* (2015.01)
  *B33Y 40/20* (2020.01)
  *B33Y 70/00* (2020.01)
  *C22C 38/00* (2006.01)
  *C22C 38/04* (2006.01)
  *C22C 38/06* (2006.01)
  *C22C 38/42* (2006.01)
  *C22C 38/44* (2006.01)
  *C22C 38/46* (2006.01)
  *C22C 38/48* (2006.01)
  *C22C 38/50* (2006.01)
  *C22C 38/52* (2006.01)
  *C22C 38/54* (2006.01)
  *B22F 10/00* (2021.01)
  *B22F 10/66* (2021.01)
  *B23K 103/04* (2006.01)
  *B33Y 80/00* (2015.01)

(52) U.S. Cl.
  CPC ............ *B22F 10/36* (2021.01); *B22F 10/64* (2021.01); *B23K 26/342* (2015.10); *B33Y 10/00* (2014.12); *B33Y 40/20* (2020.01); *B33Y 70/00* (2014.12); *C22C 38/001* (2013.01); *C22C 38/002* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *B22F 10/66* (2021.01); *B22F 2301/35* (2013.01); *B22F 2304/10* (2013.01); *B23K 2103/04* (2018.08)

(58) Field of Classification Search
  CPC ......... C22C 38/50; C22C 38/52; C22C 38/54; B33Y 10/00; B33Y 40/20; B33Y 70/00; B33Y 80/00; B22F 1/05; B22F 1/052; B22F 10/28; B22F 10/36; B22F 10/64; B22F 10/66; B22F 2301/35; B22F 2304/10; B22F 3/225
  See application file for complete search history.

(56) References Cited

U.S. PATENT DOCUMENTS

| 10,975,460 | B2 | 4/2021 | Kawano |
|---|---|---|---|
| 2002/0176793 | A1 | 11/2002 | Moussa et al. |
| 2005/0191200 | A1 | 9/2005 | Canzona et al. |
| 2009/0323508 | A1 | 12/2009 | Tomura et al. |
| 2015/0187495 | A1 | 7/2015 | Maeda et al. |
| 2018/0127866 | A1* | 5/2018 | Irumata .................. B22F 10/28 |
| 2020/0009651 | A1 | 1/2020 | van Soest et al. |
| 2020/0333295 | A1* | 10/2020 | Schiffres .............. G01N 29/041 |
| 2022/0134421 | A1 | 5/2022 | Valls Anglés |

FOREIGN PATENT DOCUMENTS

| CN | 108326285 A | | 7/2018 | |
|---|---|---|---|---|
| CN | 109500393 A | * | 3/2019 | ............ B22F 3/1055 |
| DE | 1038586 | | 9/1953 | |
| DE | 2837672 A1 | | 3/1980 | |
| DE | 100 39 144 C1 | | 11/2001 | |
| DE | 10 2016 202 885 A1 | | 9/2016 | |
| EP | 0363026 A2 | | 4/1990 | |
| EP | 0764487 A1 | | 3/1997 | |
| EP | 3591078 A1 | | 7/2018 | |
| JP | 5350181 B2 | | 5/2011 | |
| WO | 2003033751 A1 | | 4/2003 | |
| WO | 2017077137 A9 | | 5/2017 | |
| WO | 2017/111680 A1 | | 6/2017 | |

OTHER PUBLICATIONS

Espacenet Bibliographic Data and Abstract for CN 108326285, published on Jul. 27, 2018, 2 pages.
English Translation of International Search Report for PCT/EP2020/061922 dated Jul. 9, 2020, 2 pages.
Espacenet Bibliographic Data for DE 1038586 issued Sep. 11, 1958, 1 page.
Espacenet Bibliographic Data and Abstract for DE10039144, published Nov. 22, 2001, 1 page.
Espacenet Bibliographic Data and Abstract for DE102016202885, published Sep. 1, 2016, 2 pages.
Espacenet Bibliographic Data and Abstract for CN 108274000 published on Jul. 13, 2018, 2 pages.
Espacenet Bibliographic Data for JP5350181B2 issued May 12, 2011, 18 pages.
International Search Report for PCT/EP2016/076895.
Ciba Specialty Chemicals, "Coating Effects Segment chemical Structure absorption Spectrum," Apr. 2, 1998, XP055376319, http://www.xtgchem.cn/upload/20110629045535.pdf.

* cited by examiner

| Roundness | Pourability | D10 | D50 | D90 |
|---|---|---|---|---|
| 0.926 | 5.6 s/50g | 20.2 μm | 30.1 μm | 40.4 μm |

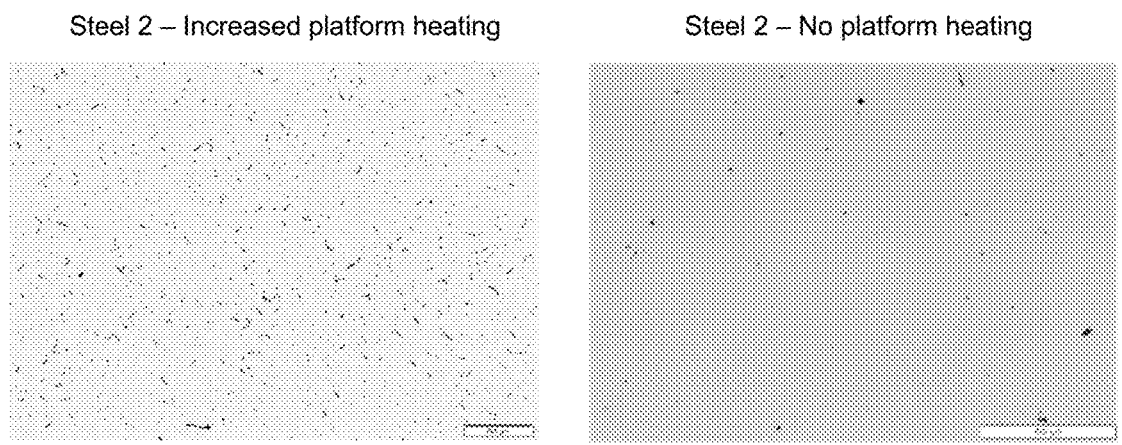
FIG 7
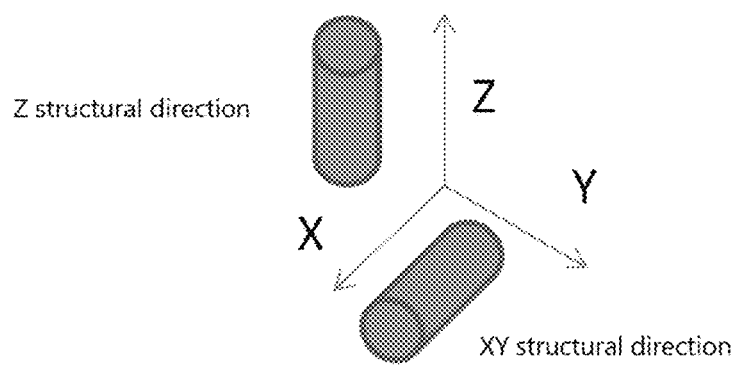
FIG 8
| wt% | C | Si | Mn | P | S | Cr | Mo | Ni | V |
|---|---|---|---|---|---|---|---|---|---|
| Steel 1 | 0.18 | 0.29 | 0.23 | 0.005 | 0.0031 | 0.97 | 0.23 | 1.27 | 0.13 |
| Steel 2 | 0.19 | 0.30 | 0.38 | 0.005 | 0.0510 | 1.00 | 0.28 | 1.39 | 0.14 |
| 16MnCr5 | 0.18 | 0.30 | 0.15 | 0.020 | 0.0300 | 0.95 | - | - | - |
FIG 9

Structure: martensitic & bainitic  Structure: martensitic

STEEL MATERIAL IN POWDER FORM AND PROCESS FOR PRODUCING SAID STEEL MATERIAL

The invention relates to a steel material for additive manufacturing, its manufacture, and a method for manufacturing articles from the steel material.

Additive manufacturing methods are now well known and widely used. In particular, it is known to manufacture workpieces using the so-called powder bed method. In the powder bed method, a powder is placed onto a support plate and the powder is melted at the places in which a component or more precisely, a wall or the like of a component, is to be produced. To accomplish this, energy is correspondingly introduced, for example by means of laser beams. Such powder bed methods work for a number of fusible materials that range from low-melting materials such as plastics to steel materials. The methods of selective laser melting and selective laser sintering in particular are used with steel materials. Once the desired fusion has been carried out in a layer of powder, then another powder layer is applied and the support plate is lowered. Then the next powder layer is fused, on the one hand to itself and on the other hand, to the powder layer beneath it. In this way, the additive manufacturing method is used to build a component layer by layer, one after another.

In classic steel manufacturing, a steel material is melted, for example in a converter or electric arc furnace, then treated by ladle metallurgy, then cast, and then for example forged, rolled, or processed in some other way.

In classic steel manufacturing and particularly with stainless steels or steels for special applications, the properties of the steel material are adjusted by means of at least one or several heat treatment stages. For example, these heat treatments include hardening and tempering. In hardening, the steel material is heated to above Ac3 in order to transform ferrite completely into austenite and is then rapidly cooled ("quenched"), for example in water, oil, or a polymer. This transforms the austenite into hard martensite. Tempering takes place at low temperatures between 150 and 500° C. and reduces the hardness in favor of a greater toughness. "Hardening and tempering" describes the combined heat treatment that consists of hardening and subsequent tempering.

Since it is necessary to rely on these conventional manufacturing routes in the processing of steel powders, a different path must be taken to ensure that corresponding properties of the steel materials are achieved.

It should also be noted that in additive manufacturing methods, many steel materials unfortunately exhibit anomalies that make it impossible or very difficult to control the additive manufacturing method. In particular, this is also accompanied by the fact that the equipment of the manufacturer and in particular the equipment of companies that are to produce prototypes out of such steel materials is not on par with the equipment of companies that process steel on a large scale.

The object of the invention is to provide a steel material for additive manufacturing, which, in addition to favorable processing properties, delivers outstanding results that also enable semiprofessional production of high-quality components. Another object of the invention can be seen as to manufacture components that have good mechanical properties, preferably high strength and high toughness, immediately after the additive manufacturing, in particular without heat treatment.

The object is attained with a steel material having the features of claim 1.

Advantageous modifications are disclosed in the dependent claims.

Another object is to create a method for manufacturing the steel material.

This object is attained with the features of claim 7.

Advantageous modifications are disclosed in the dependent claims that depend thereon.

Another object is to disclose a method for manufacturing a component.

This object is attained with the features of claim 9. Advantageous modifications are disclosed in the dependent claims that depend thereon.

Wherever percentage is mentioned in the following, particularly in connection with the alloy or chemical composition of a steel material, this always means wt %. If only the alloy elements are listed, the remainder is always comprised of 100 wt % iron and inevitable impurities.

The material according to the invention has a selected chemical composition, which especially predestines it for additive manufacturing. The percentage of unwanted residual austenite in the additively manufactured component is minimized to the greatest extent possible. The transformation of residual austenite into martensite can lead to a volume increase of 3%. The resulting stresses can cause component damage. In addition, the additively manufactured component can have a bainitic structure, which is advantageous with regard to greater toughness.

In particular, the material according to the invention has a low alloy content of carbon as well as a low sulfur content so that it is well-suited to additive manufacturing. The material in this case behaves so well in production that it permits production of near-series quality components with performance characteristics that toughen them up for use. This material can also be pre-hardened and pre-tempered to different strengths or can be surface-hardened or case-hardened using thermochemical methods such as PVD coating, plasma nitriding, etc.

In all of the examples in the tables below, the remainder is 100% comprised of iron and inevitable impurities. The material according to the invention here has the following composition:

| wt % | C | Si | Mn | P | S | Cr | Mo | Ni | V |
|---|---|---|---|---|---|---|---|---|---|
| Invention | 0.17-0.23 | 0.10-0.80 | 0.15-0.45 | <0.03 | <0.015 | 0.8-2.0 | 0.15-0.80 | 0.1-2.0 | 0.1-2.0 |
| Preferred | 0.17-0.21 | 0.15-0.30 | 0.15-0.45 | <0.03 | <0.010 | 0.8-1.1 | 0.15-0.25 | 1.0-1.5 | 0.1-0.2 |

This material according to the invention differs from a number of already known materials but these have either not been used for additive manufacturing methods or exhibit great differences in additive manufacturing.

| wt % | C | Si | Mn | P | S | Cr | Mo | Ni | V |
|---|---|---|---|---|---|---|---|---|---|
| Invention | 0.17-0.23 | 0.10-0.80 | 0.15-0.45 | <0.03 | <0.015 | 0.8-2.0 | 0.15-0.80 | 0.1-2.0 | 0.1-2.0 |
| 1.6566 | 0.14-0.20 | <0.40 | 0.60-0.90 | <0.025 | <0.035 | 0.8-1.1 | 0.15-0.25 | 1.2-1.5 | — |

The main difference between the materials shown lies among other things in the vanadium content. In the invention, vanadium has been added to the alloy in order to delay the pearlite formation to longer times. Compared to the known material 17NiCrMo6-4 (material number 1.6566), this prevents the pearlite region from being reached. It has turned out that in order to be able to ensure that a bainitic structure is obtained in the built state, the addition of vanadium is absolutely necessary. If the components are thick-walled, then the addition of vanadium can be increased to up to 2% in order to reliably remain in the bainite region.

The manganese content in the invention is at most 0.45% in order to prevent the formation of manganese sulfide and residual austenite. Manganese sulfide negatively influences the mechanical properties; the increased manganese content compared to the invention in the 17NiCrMo6-4 outlined above is typical for classic case-hardened steels. A classic case-hardened steel of this kind, however, has only a limited suitability for additive manufacturing methods.

| wt % | C | Si | Mn | P | S | Cr | Mo | Ni | V |
|---|---|---|---|---|---|---|---|---|---|
| Invention | 0.17-0.23 | 0.10-0.80 | 0.15-0.45 | <0.03 | <0.015 | 0.8-2.0 | 0.15-0.80 | 0.1-2.0 | 0.1-2.0 |
| 1.6932 | 0.24-0.34 | <0.40 | 0.15-0.40 | <0.035 | <0.035 | 1.0-1.5 | 0.35-0.55 | 1.8-2.1 | 0.05-0.15 |

In relation to 28NiCrMoV8-5 (material number 1.6932), a main difference between the two materials lies in the carbon content; the carbon content in this classic hardened and tempered steel according to the prior art is relatively high so that after the printing, a purely martensitic structure would be obtained. A purely martensitic structure, though, is not optimal for additive manufacturing and in particular, is not optimal for prototype production since such a material only has a poor suitability without heat treatment because the material is very brittle due to the purely martensitic state.

| wt % | C | Si | Mn | P | S | Cr | Mo | Ni | V |
|---|---|---|---|---|---|---|---|---|---|
| Invention | 0.17-0.23 | 0.10-0.80 | 0.15-0.45 | <0.03 | <0.015 | 0.8-2.0 | 0.15-0.80 | 0.1-2.0 | 0.1-2.0 |
| JP2011094169 | 0.10-0.30 | 0-2.50 | 0.10-0.20 | 0-0.03 | 0-0.1 | 0.3-2.0 | 0.05-1.5 | 0-1.0 | 0-0.2 |

JP-2011-094169 has disclosed a steel material that boasts very wide ranges; in addition to the table indicated above, it contains 0.1% aluminum, 0.055-0.09% niobium, and 0.008% titanium. These titanium-niobium precipitations inhibit grain growth during case-hardening. In the casting processes, precipitations are produced in the temperature range between 700 and 1000° C.; this also depends on the cooling rate; the cooling speed is between 15° C. per minute and 5° C. per minute. The effect cannot be used in the above-mentioned process since the cooling speed is so high that these precipitations have no time to form.

The effect of the individual alloy elements and their purpose in the invention will be addressed below.

Carbon

A low carbon content is crucial for a good weldability, which is of considerable importance in the additive manufacturing because ultimately, the powder particles are welded to one another. For this reason, the terms "weldability" and "printability" are often used synonymously. The carbon primarily serves to form carbon martensite. Rapid cooling from the austenite region causes martensite to form; the carbon remains forcibly dissolved in the solid solution and thus distorts the lattice so that this results in a volume increase and also a hardness increase in the steel. In addition, carbon lowers the melting temperature, which is in particular very important in the atomization of the steel for the production of the powder. Even extremely small changes in the carbon content have a very large influence on the mechanical properties of a steel material.

In the invention, the carbon content should be above 0.17% so that a carbon martensite can form and the desired hardness is achieved. But the carbon content should not be above 0.23% since good printability would no longer be guaranteed and a purely martensitic structure would be obtained in the built state. The upper limit can also be selected as 0.22% or 0.21%, which further improves the weldability and thus printability. Between 0.17 and 0.21% C is a preferred range with regard to good weldability and sufficient achievable hardness.

Silicon

Silicon is a solid solution hardener and is not a secondary hardness carbide-forming element. But silicon does influence the carbide precipitation kinetics in the steel. Silicon provides a delay in carbide formation; in addition, silicon functions as a deoxidizer and for manufacturing-related reasons, is thus present in low concentrations in nearly all steels. Silicon increases scale resistance, yield strength, and tensile strength. In case-hardening, silicon is an element that suppresses the decrease in hardness in the tempering treatment after the carburizing process and ensures the hardness of the surface layer of the carburized part. With silicon contents below 0.10%, the strength decreases; moreover, this is the technological lower limit in order for it to function as a deoxidizer. The lower limit can be selected to be 0.15, 0.20, or 0.25%. Silicon contents above 0.80% reduce the weldability. The upper limit can also be selected to be 0.70, 0.60, 0.50, 0.40, or 0.30%, which gradually improves the weldability further. Between 0.15 and 0.30% Si is a preferred range with regard to good weldability and sufficient hardness.

Manganese

The addition of manganese causes a reduction in the critical cooling speed. This results in an increase in the hardening depth (through hardenability). Like silicon, manganese is a powerful deoxidizer and when it comes to hardenability and through hardening, is one of the most advantageous and effective alloy elements. Excessively high manganese contents have negative effects on the metal melt in the deoxidation process; with a manganese content below 0.45%, the deoxidation can occur in a controlled fashion. Higher concentrations can result in a reduction in thermal conductivity and in an interaction with sulfur or oxygen to form undesirable nonmetallic inclusions (MnS, MnO). Manganese widens and stabilizes the austenite region and thus suppresses the beginning of the bainitic transformation and in this respect, functions as a so-called transformation delaying element. With increasing manganese content, the bainite start temperature (Bs) is shifted toward lower temperatures. This also shifts the martensite formation toward lower temperatures, which generates a large quantity of residual austenite even with water quenching. Residual austenite, however, is undesirable. In conventional welding methods, i.e. other than in additive manufacturing, sulfur is bonded to form manganese sulfide so that the formation of low-melting iron sulfide phases is prevented. It has surprisingly turned out that with manganese contents between 0.15 and 0.45%, manganese sulfide does not form during additive manufacturing.

With the invention, the manganese content is at most 0.45% in order to prevent the formation of manganese sulfide since it can negatively influence the mechanical properties. Higher manganese contents can also lead to quenching embrittlement and more residual austenite. The upper limit can also be selected to be 0.40. With manganese contents lower than 0.15%, the strength decreases; the through hardenability also decreases. The lower limit can also be selected to be 0.20% or 0.25%; this makes it possible to increase the strength.

The selective alloy adjustment according to the invention through reduction of the manganese content and low sulfur contents in combination with the rapid solidification conditions of the 3D printing process in the additive manufacturing demonstrably does not lead to the formation of any manganese sulfides in the as-printed state with the invention but also does not do so in the subsequent heat-treated state so that the mechanical properties with regard to strength, toughness, and ductility are particularly good.

Chromium

The addition of chromium to the alloy improves the through hardenability. The addition of chromium to the alloy causes a reduction in the critical cooling speed. This improves the through hardenability and the hardenability/temperability of the steel to a very significant degree. On the one hand, chromium delays the bainite transformation, which means that the transformation region is shifted to the right in the TTT diagram, and on the other hand, it sharply reduces the martensite starting temperature (Ms). This can lead to the formation of residual austenite. In case-hardened steels, there is a risk of overcarburization in the boundary region due to reduced carbon diffusion and the accompanying elevated residual austenite contents. Below 0.80% Cr, the strength decreases; in addition, the through hardenability is diminished. The lower limit can also be selected to be 0.85 or 0.90%. Above 2.0% Cr, the weldability may be reduced. The upper limit can also be selected to be 1.9, 1.8, 1.7, 1.6, 1.5, 1.4, 1.3, 1.2, or 1.1, which gradually improves the weldability. Chromium contents between 0.8 and 1.1% are particularly preferable.

Molybdenum

Molybdenum is added to the alloy to improve the through hardenability. Adding molybdenum to the alloy increases the activation energy for the carbon diffusion in the austenite and thus reduces the diffusion coefficient for carbon and more precisely, reduces the carbon diffusion. This results in lower bainite start temperatures (Bs) and in reduced bainite formation. The addition of molybdenum to the alloy results in a refinement of the microstructure, i.e. a fine structure is prevalent regardless of the cooling rate. Below 0.15% Mo, the tempering resistance and the through hardenability decrease. The lower limit can also be selected to be 0.20. The upper limit can be selected to be 0.80, 0.70, 0.60, 0.50, 0.40, 0.30, or 0.25% Mo. Molybdenum contents between 0.15 and 0.25% are particularly preferable.

Nickel

Nickel increases the through hardenability. The reason for this is the reduction in the critical quenching speed. In addition, nickel ensures an improvement in the toughness properties and a shifting of the transition temperature of the notched bar impact work toward lower values. Nickel is an austenite-stabilizing element and as a result, an alloy with an excessively high nickel content likewise tends to form residual austenite. Below 0.1% Ni, the through hardenability decreases and the toughness is reduced. The lower limit can also be selected to be 0.2, 0.4, 0.6, 0.8, or 1.0% Ni. In larger components, nickel contents above 2% are important for the through hardenability; additively manufactured components are usually not too large and thus 2% Ni is sufficient. In addition, higher nickel contents can promote unwanted residual austenite. The upper limit can also be selected to be 1.9, 1.8, 1.7, 1.6, or 1.5% Ni. Nickel contents between 1.0 and 1.5% are particularly preferable.

Vanadium

Vanadium is a ferrite stabilizer and also sharply reduces the bainite starting temperature (Bs). With slower cooling, this suppresses the formation of pearlite and enables a formation of bainite or martensite. Vanadium functions as a powerful carbide-forming element. Improvements in the toughness properties by means of finely distributed carbides are already achieved with a 0.1% vanadium content.

With the invention, in order to ensure a bainitic structure already in the printed state, the addition of vanadium to the alloy is absolutely necessary. In the case of thick-walled components, the addition of vanadium to the alloy can be increased to up to 2% in order to ensure a bainitic structure. For large components, the upper limit can be selected to be 2%; in smaller components, correspondingly lower vanadium contents are sufficient. Depending on the desired component size, the upper limit can be selected to be 2.0, 1.8, 1.5, 1.2, 1.0, 0.8, 0.6, 0.4, 0.3, or 0.2%. With small components, a vanadium content of 0.2% is preferable for cost reasons.

Niobium

Apart from vanadium, another of the microalloying elements is niobium. Like vanadium, this element has a high affinity to C and N and thus forms nitrides, carbides, and carbonitrides. Nb carbonitrides have a higher stability in comparison to V. For this reason, a higher austenitization temperature would also be required in order to bring these carbonitrides into solution. As a result, no more than 0.5% should be added to the alloy. The optional addition of niobium to the alloy can cause a grain refinement to occur and thus also an increase in strength and toughness. The grain-refining effect with niobium is somewhat stronger than with vanadium; even 0.001% Nb exhibits a grain-refining effect. The addition of niobium to the alloy is optional. The lower limit can even be selected to be 0%. The upper limit can be selected to be 0.5, 0.4, 0.3, 0.2, 0.1, or 0.05%.

Optionally, up to 1.6% tungsten can also be added to the alloy, which behaves similarly to molybdenum and can usually be substituted at a ratio of 1:2 (the doubled quantity of W corresponds to the single quantity of Mo). Optionally, up to 1% Cu, up to 1% Al, up to 1% Co, up to 0.5% Ti, up to 0.5% Ta, up to 0.5% Zr, up to 0.15% N, and up to 1% B can also be added to the alloy.

Sulfur

In iron, sulfur forms iron sulfides such as FeS. Above 1200° C., FeS precipitations can cause a hot cracking at the grain boundaries. Through the above-mentioned addition of manganese, sulfur forms so-called manganese sulfides (MnS), which have a positive effect on the material-removing machining, but has a negative effect on the mechanical properties since these defects can reduce the toughness. The usual sulfur content in standard case-hardened steels (e.g. 1.7131) is ≤0.035%. This is sufficient for the weldability in conventional welding methods. Surprisingly, this does not apply to the printability.

Surprisingly, it has been possible to sharply improve the mechanical characteristic values and especially the toughness of the additively manufactured component by means of a sulfur reduction far below the usual limits. Additively manufactured components of this alloying concept are usually relatively brittle without heat treatment. For this reason, a heat treatment consisting of a hardening and tempering or also consisting of tempering alone is normally necessary in order to reduce the brittleness, characterized by a low notched bar impact work, to such an extent that it can be used for prototype production and cannot be potentially destroyed by shocks, vibrations, or torsional strains. The steel material according to the invention is extremely well-suited for producing additively manufactured components, which even without heat treatment, can withstand rugged handling and be immediately used for prototype tests. Even after a heat treatment, such as hardening and tempering or tempering alone, the toughness is better compared to the variant in which sulfur as not been reduced.

According to the hypothesis, the sulfur, as a surface-active element, moves to the melt front in the additive manufacturing, accumulates there, and results in low-melting compounds (above all FeS). This results in extremely fine hot cracks. Such defects are primarily apparent in a reduced notched bar impact work. In conventional welding processes, the sulfur in the melt pool bonds to manganese to form MnS so that the content of free sulfur is reduced. This suppresses the formation of FeS and thus hot cracks.

On the other hand, the cooling rates are very high in additive manufacturing and the formation of MnS is hindered kinetically. The sulfur remains mobile and leads to the formation of FeS and thus to the above-mentioned hot cracks. This explains why the additive manufacturing is surprisingly much more sensitive with regard to the sulfur content. In the invention, the sulfur content should be lower than 0.015% since otherwise, a sulfur-rich phase can form at the boundary surfaces of the welding beads. This phase subsequently results in a material separation.

According to the invention, however, the sulfur content must at least lie below the limit value of 0.015% since otherwise, cracks can form close to the welding beads during the printing process. The sulfur is not homogeneously dispersed in the material since a sulfur-rich phase forms in front of the solidification front, which has a lower melting point than the base material and thus solidifies in a delayed fashion. Since this phase constitutes a material separation (comparable to a nonmetallic inclusion), increased crack formation occurs in the region of the welding bead boundary surfaces. Proof of this was found by means of microprobe measurement in that the sulfur concentration in the crack region is three times higher than in the base material. The alloy with a sulfur content of 0.003% exhibits no cracks after the printing process and has an exceptionally high notched bar impact work. The upper limit can also be selected to be 0.010, 0.008, 0.006, 0.005, or 0.003% sulfur. The lower the sulfur content is, the greater the toughness is since the notched bar impact work is increased.

Heat Treatment

According to the invention, even without subsequent heat treatment, the additively manufactured components are suitable for immediate use as prototypes. If necessary, the components can be hardened at 800 to 950° C. for 10 to 60 min. Preferably, the hardening is carried out at 850° C. for 30 min. The time span refers to the point at which the component has been completely heated all the way through. The lower limit is the result of Ac3+30° C. Higher hardening temperatures can lead to grain coarsening and thus to a loss of hardness. Longer holding times can also lead to an unwanted grain coarsening. Then tempering can be carried out at 150 to 250° C. for 1 to 4 h. The tempering procedure can be repeated multiple times. Preferred mechanical properties can be achieved at a tempering temperature between 180 and 220° C., particularly preferably at 200° C., and with a holding time of 2 h.

Figure 2:
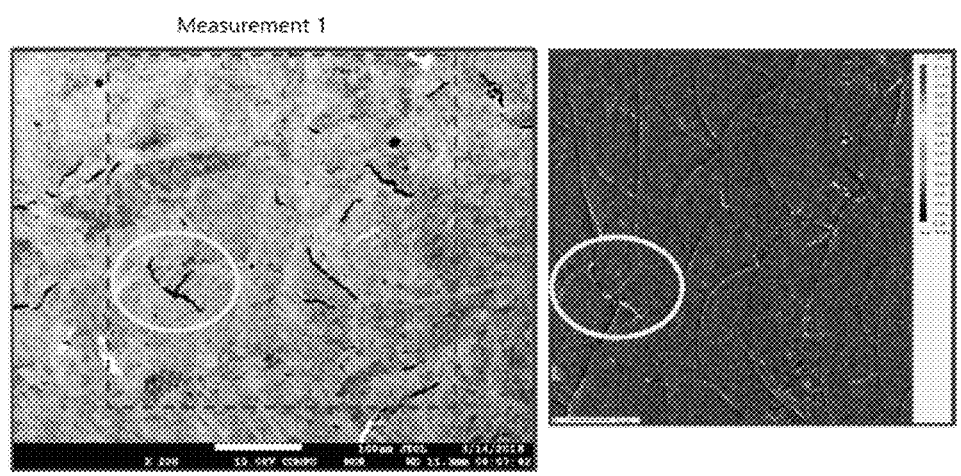
Figures 3, 4:
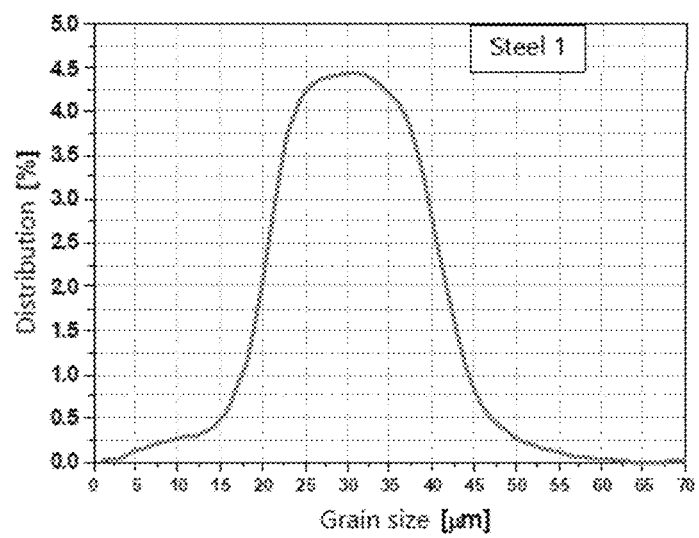
Figure 5A:
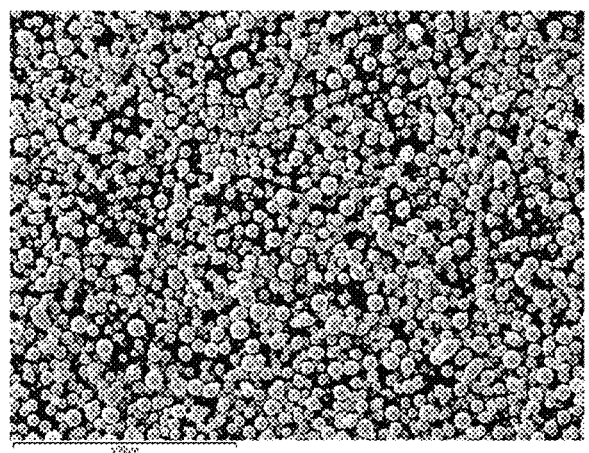
Figure 6:
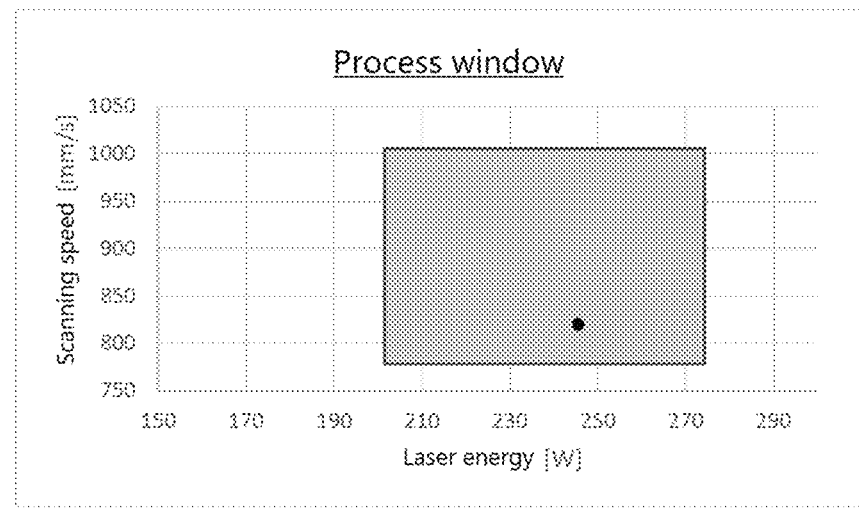
Figure 10:
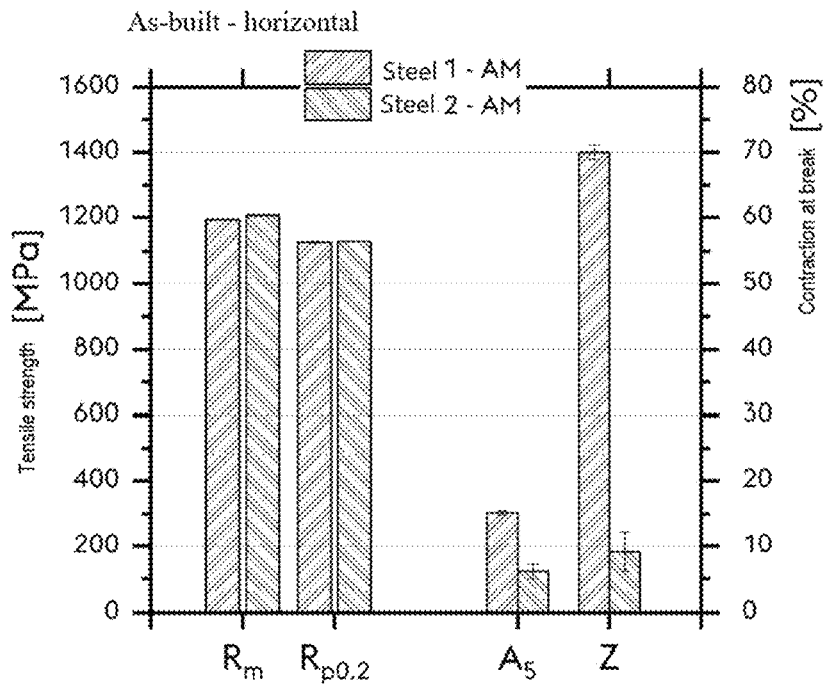
Figure 11:
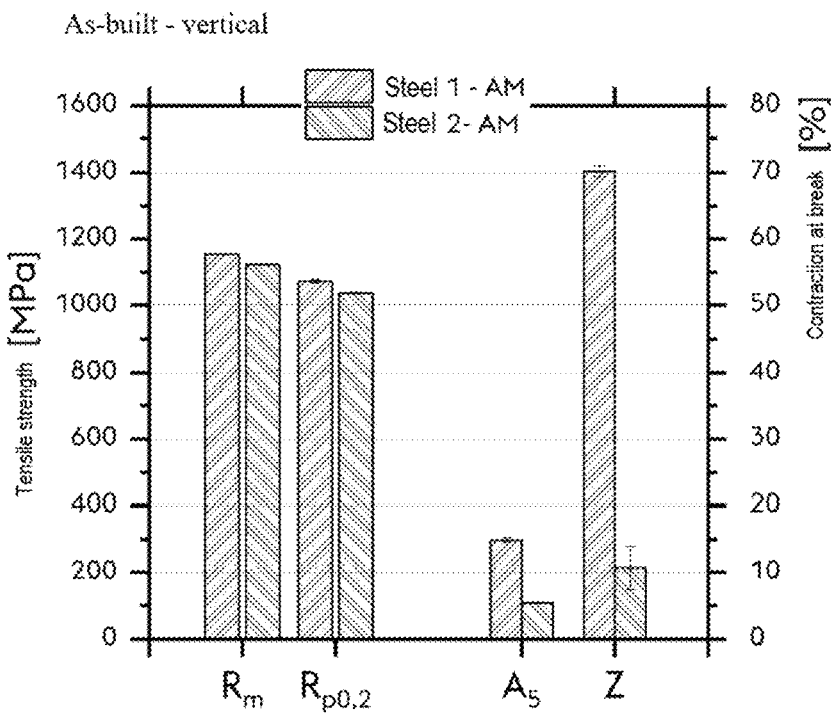
Figure 12:
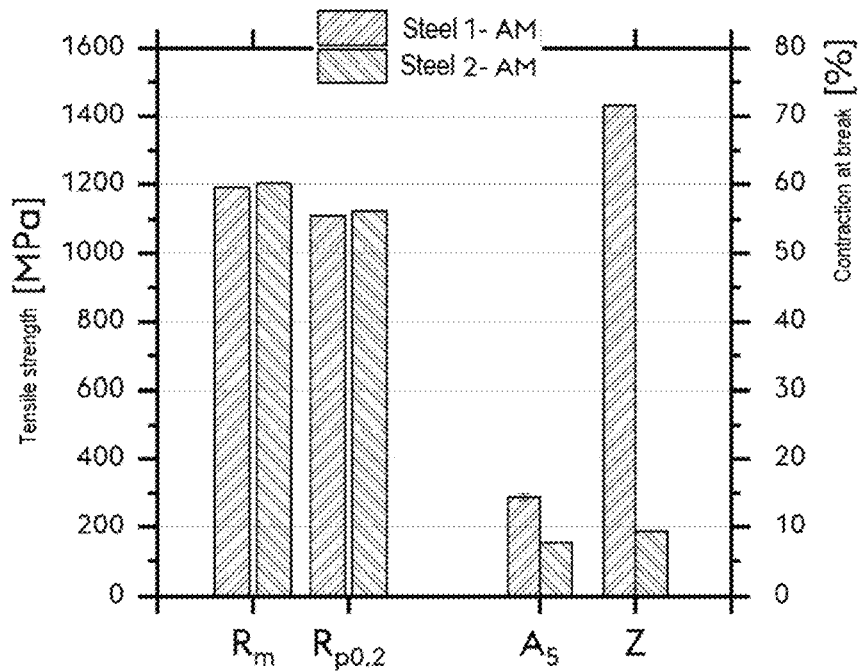
Figure 13:
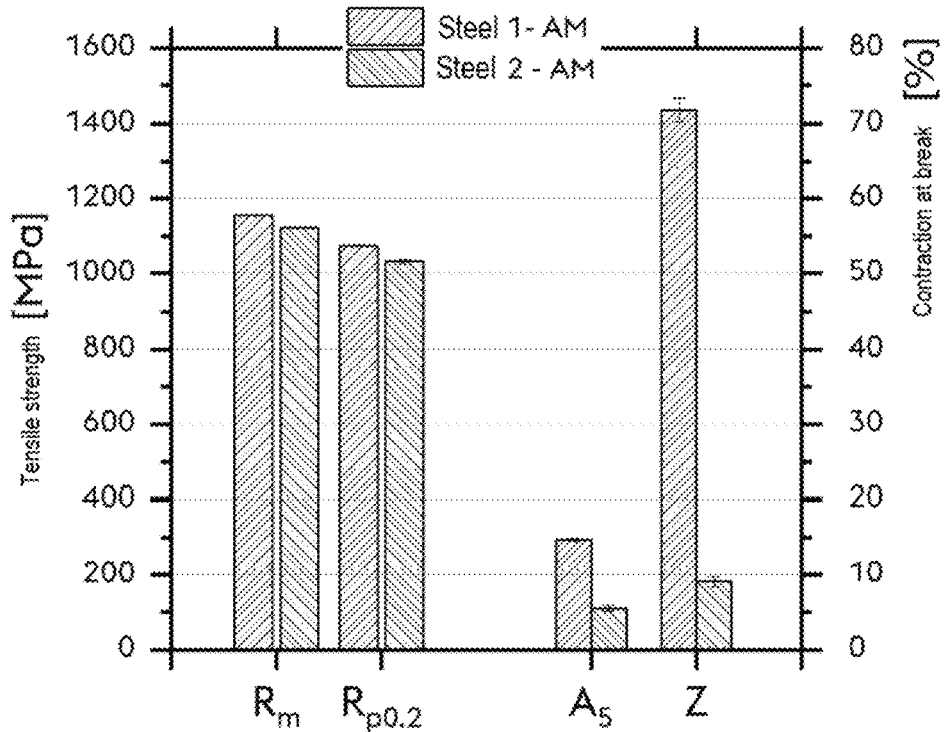
Figure 14:
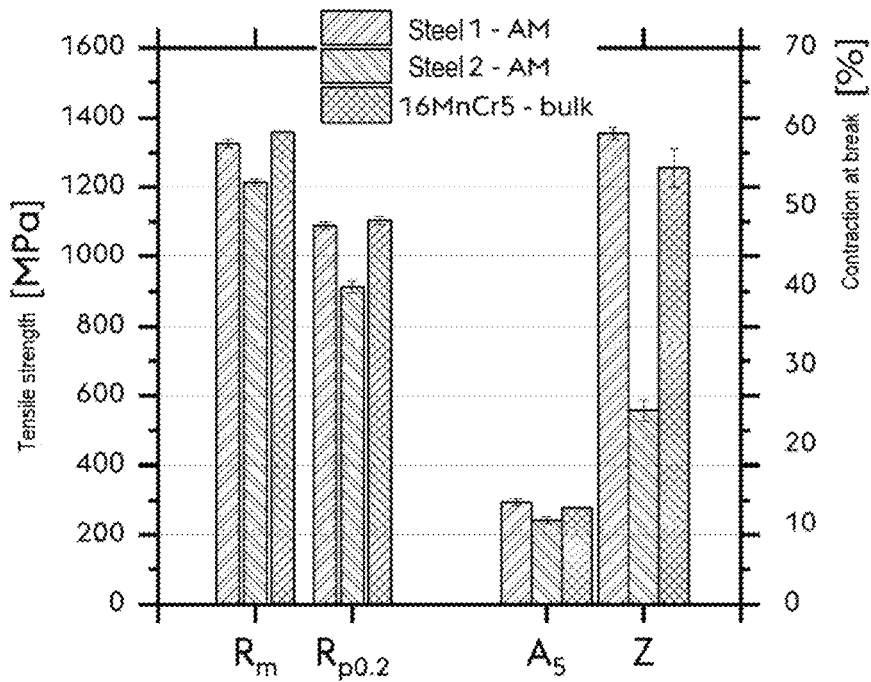
Figure 15:
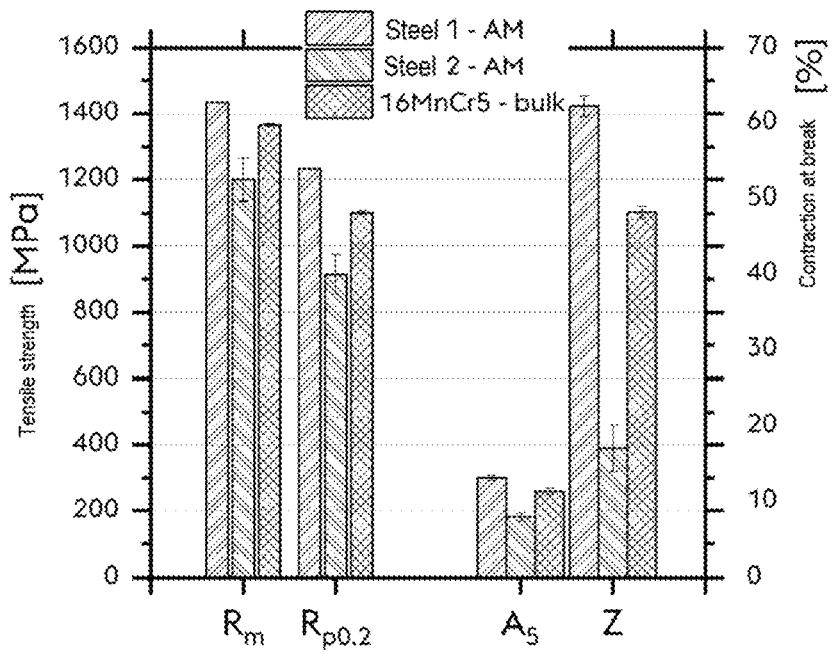
Figure 16:
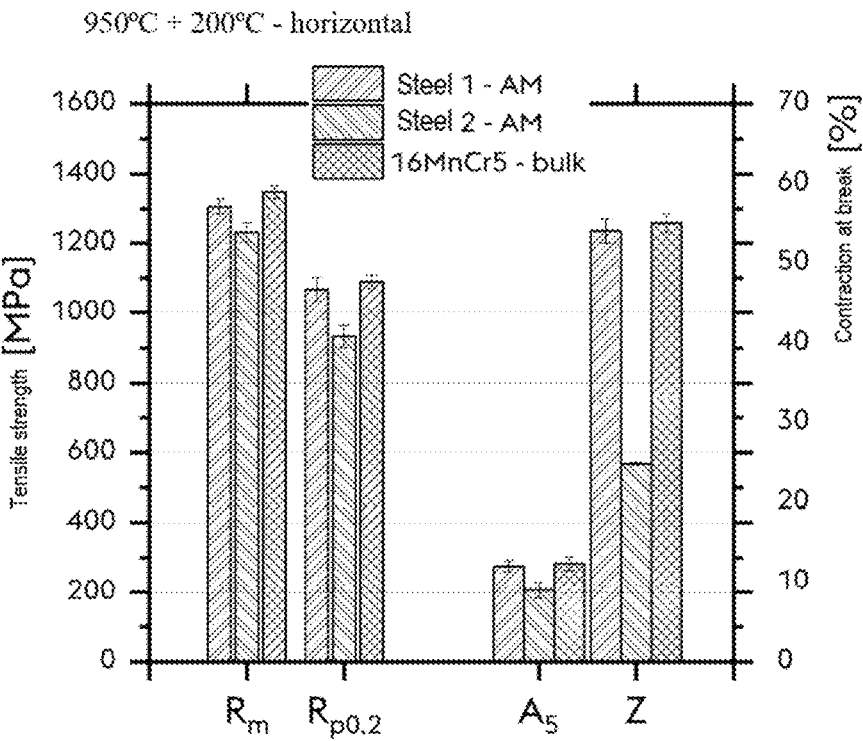
Figure 17:
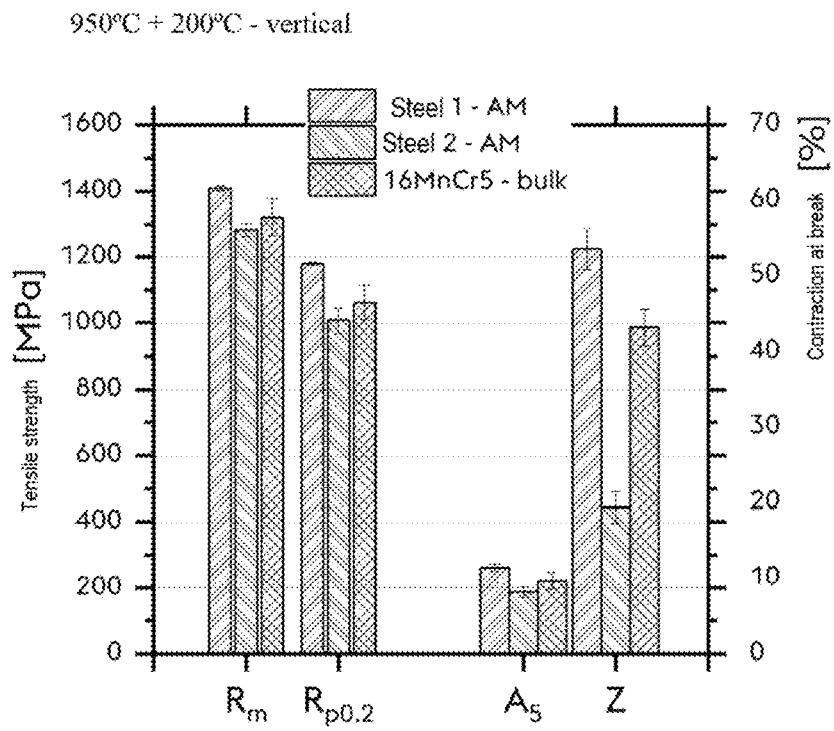
Figure 18:
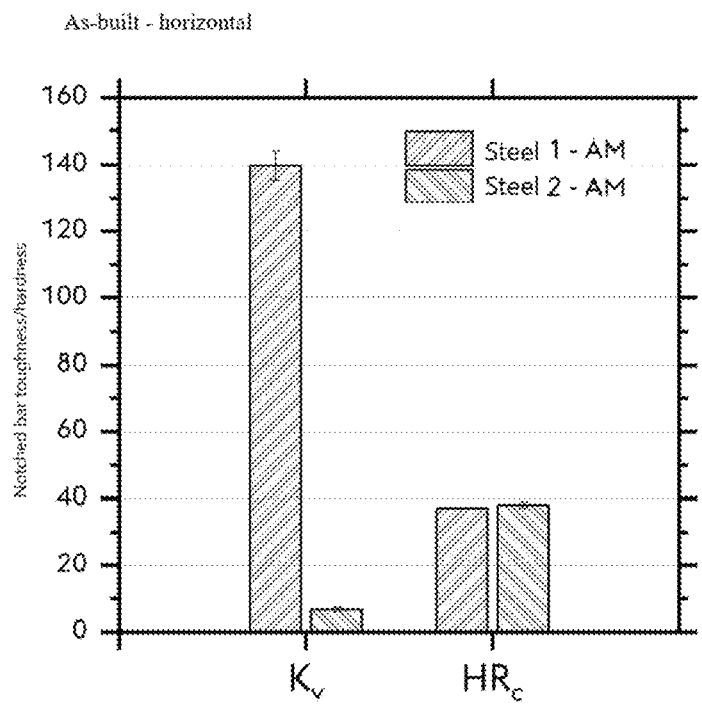
Figure 19:
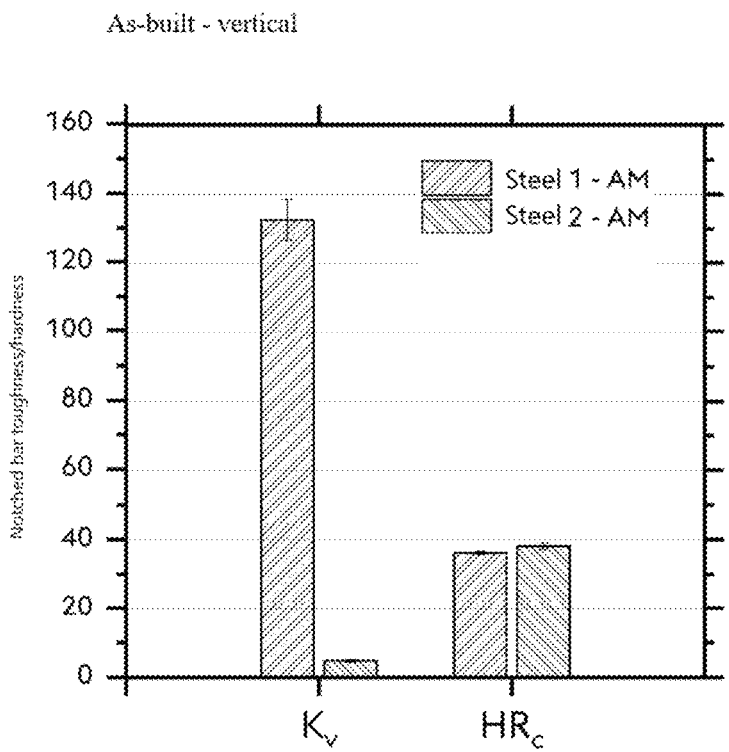
Figure 20:
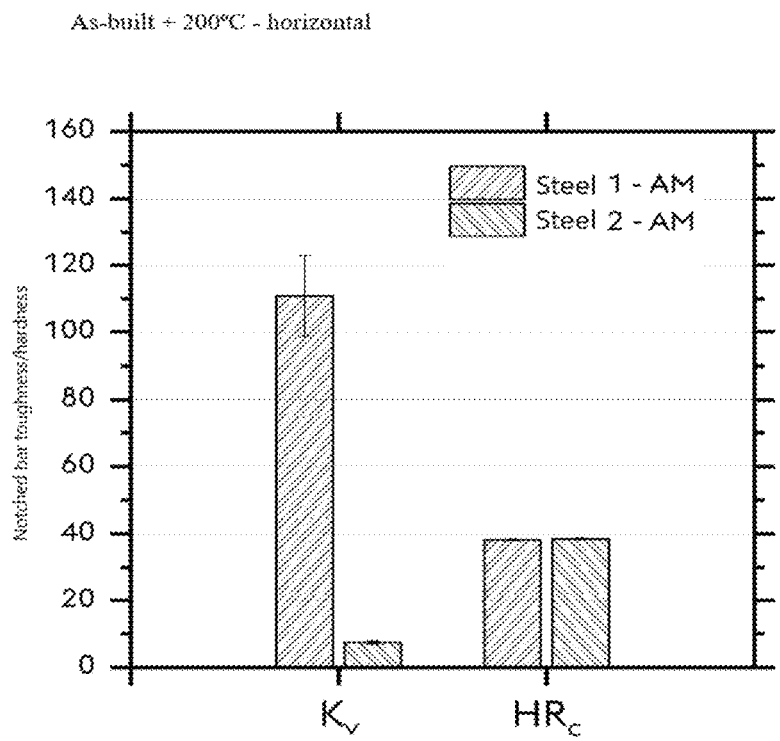
Figure 21:
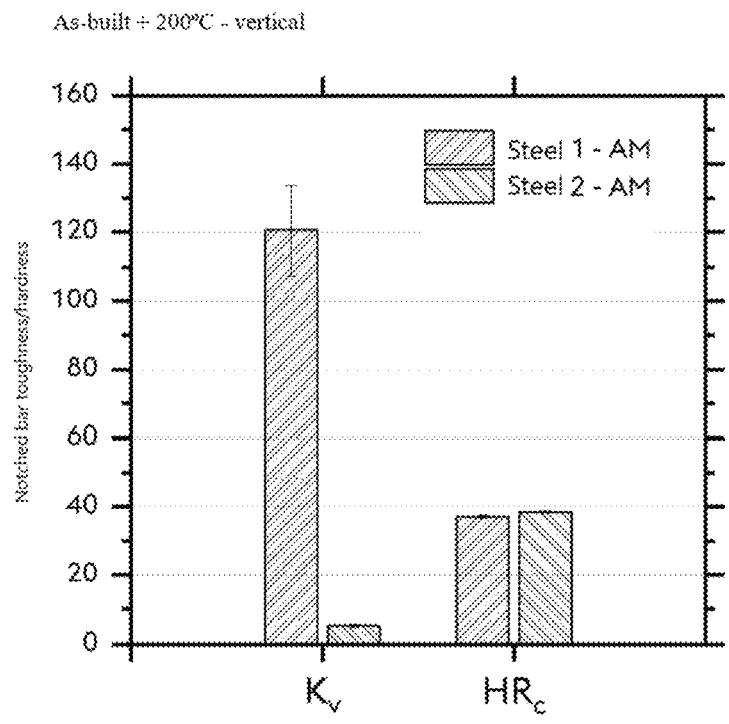
Figure 22:
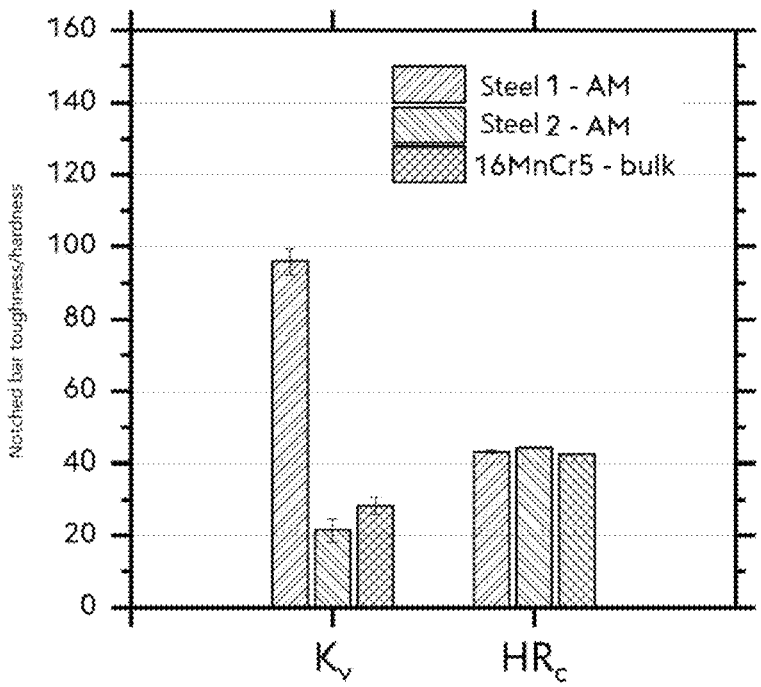
Figure 23:
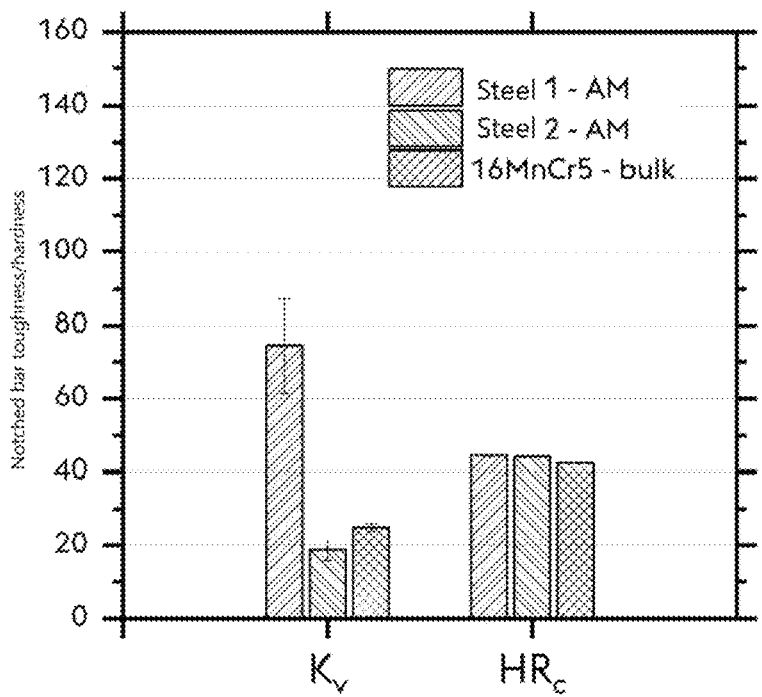
Figure 24:
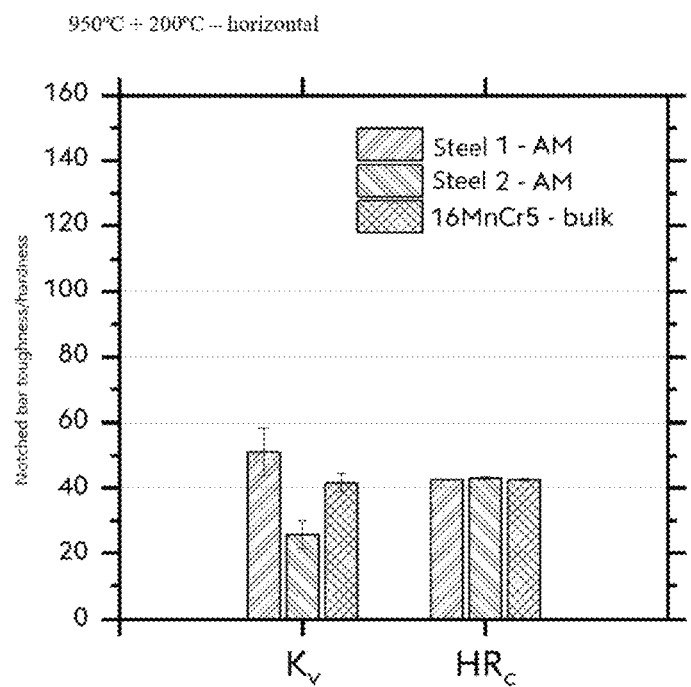
Figure 25:
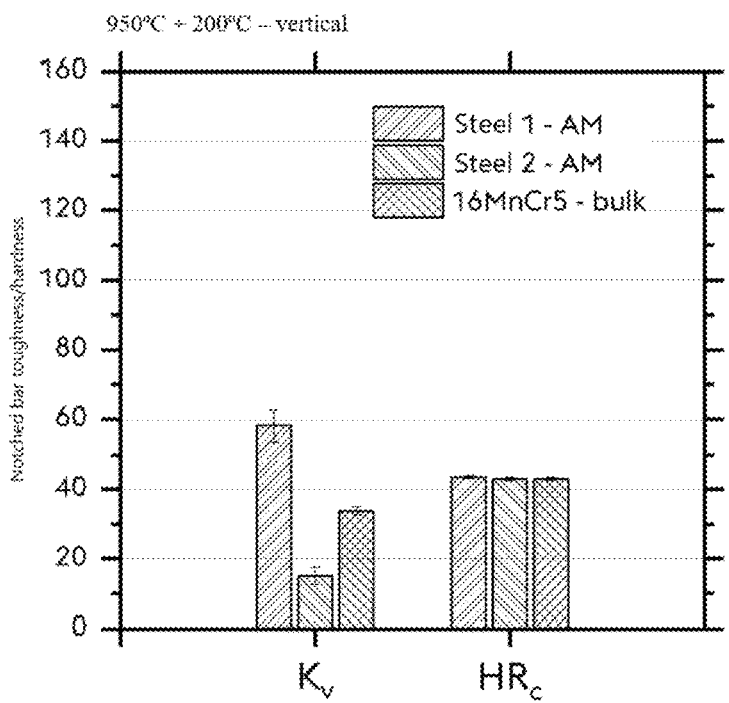
Figure 26:
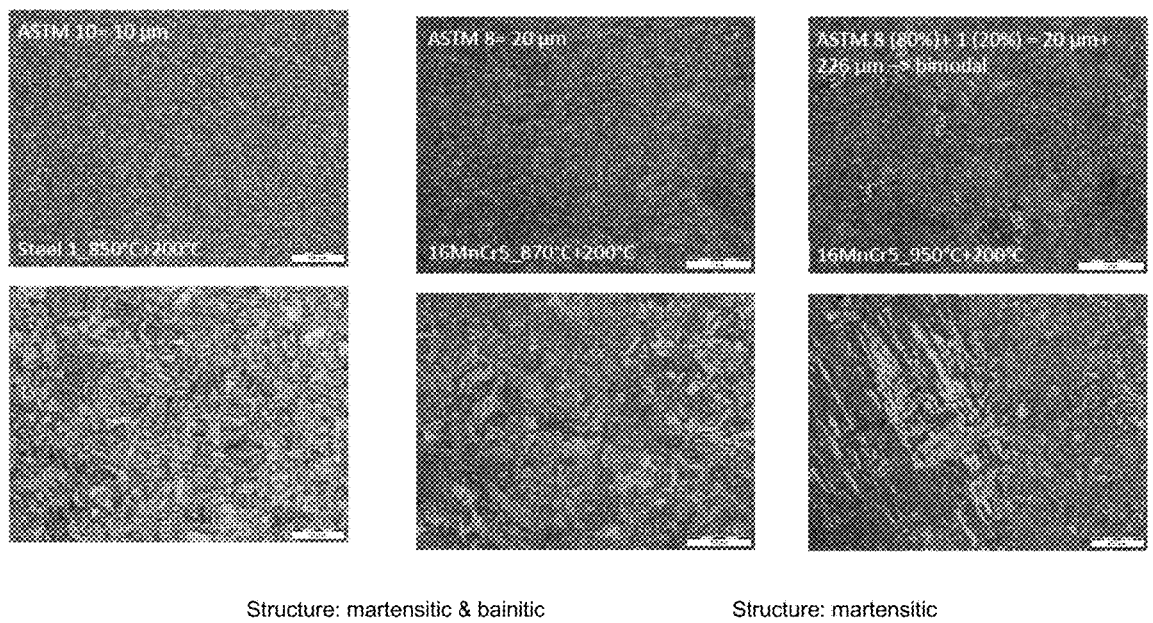

The invention will be explained by way of example based on the drawings. In the drawings:

FIG. 1: shows the influence of the sulfur content on the crystalline structure and the crack formation;

FIG. 2: shows the influence of the manganese and sulfur content on the structure, FIG. 3: shows the particle size distribution;

FIG. 4: is a table showing a sample powder;

FIGS. 5a and b: show electron microscope images of the powder produced;

FIG. 6: shows the available process window for the processing of the steel powder according to the invention;

FIG. 7: shows the comparison of the structure (steel 2) with platform heating and without platform heating;

FIG. 8: is a diagram showing the possible structural directions:

FIG. 9: shows a comparison of the invention (steel 1) to a standard case-hardening (16MnCr5) and another test alloy with a higher sulfur content (steel 2);

FIG. 10: shows a comparison of the mechanical properties between steel 1 and steel 2 in the as-printed horizontal state;

FIG. 11: shows the comparison of the materials according to FIG. 10 in the as-printed vertical state;

FIG. 12: shows the comparison according to FIG. 10 with a tempering at 200° C.;

FIG. 13: shows the comparison according to FIG. 11 with a tempering at 200° C.;

FIG. 14: shows the comparison of the mechanical properties (steel 1, steel 2, and the comparison material 16MnCr5) after hardening at 850° C. and tempering at 200° C. in the horizontal state;

FIG. 15: shows the comparison according to FIG. 14 in the vertical state;

FIG. 16: shows the comparison according to FIG. 14, but with a hardening at 950° C.;

FIG. 17: shows the comparison according to FIG. 15, but with a hardening at 950° C.;

FIG. 18: shows the comparison of the material according to the invention to steel 2 with regard to the notched bar impact work and the Rockwell hardness in the as-printed horizontal state;

FIG. 19: shows the comparison according to FIG. 18 in the as-printed vertical state;

FIGS. 20 & 21: show the comparison according to FIGS. 18 & 19 with an additional tempering treatment at 200° C.;

FIGS. 22 & 23: show the comparison of the mechanical properties of the material according to the invention to steel 2 and the 16MnCr5 with a hardening at 850° C. and a tempering treatment at 200° C., the one in the horizontal state and the other in the vertical state;

FIGS. 24 & 25: shows the comparison according to FIGS. 22 & 23, but with a hardening at 950° C.;

FIG. 26: shows the comparison of the structure between a comparison material and the material according to the invention.

Figure 27:
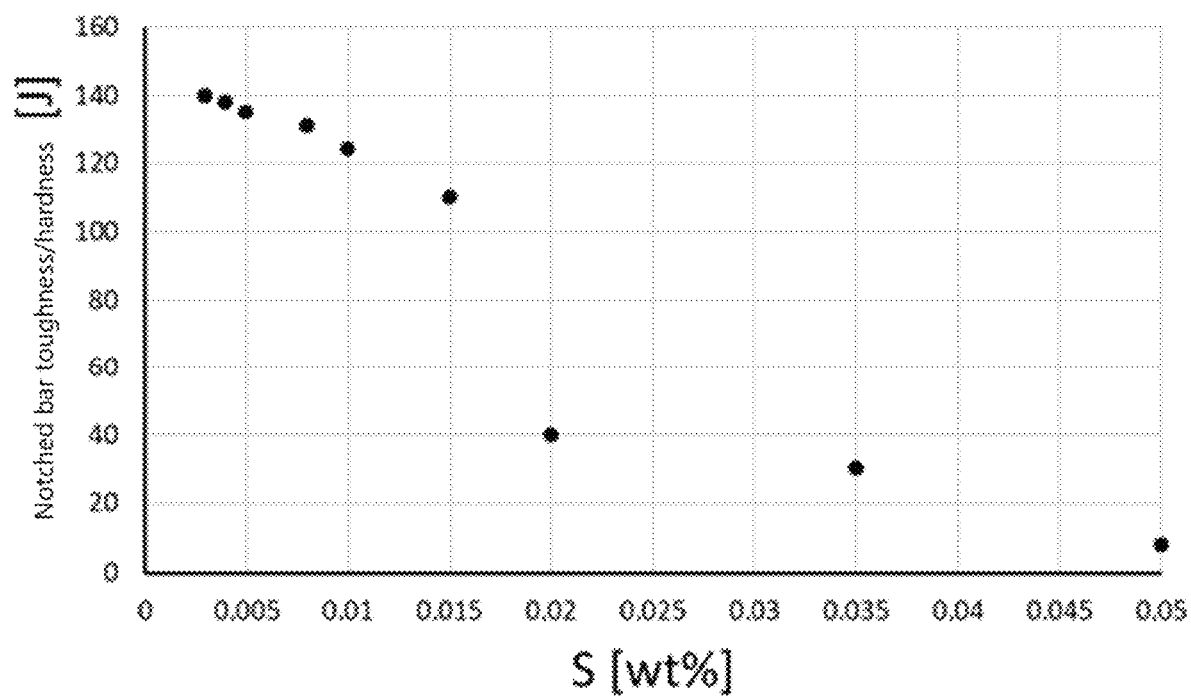

FIG. 27: shows the influence of various sulfur contents on the notched bar impact work of the printed components (without heat treatment)

The steel composition according to the invention has the following composition:

| wt % | C | Si | Mn | P | S | Cr | Mo | Ni | V |
|---|---|---|---|---|---|---|---|---|---|
| Invention | 0.17-0.23 | 0.10-0.80 | 0.15-0.45 | <0.03 | <0.015 | 0.8-2.0 | 0.15-0.80 | 0.1-2.0 | 0.1-2.0 |
| Preferred | 0.17-0.21 | 0.15-0.30 | 0.15-0.45 | <0.03 | <0.010 | 0.8-1.1 | 0.15-0.25 | 1.0-1.5 | 0.1-0.2 |

One property of this composition is that the sulfur content is below 0.015 wt % since otherwise, cracks close to the welding beads can form in the printing process.

At the top left, FIG. 1 shows the structure with 0.051% sulfur (steel 2) and as an extreme counter-example, with 0.003% sulfur next to it (steel 1). The two figures on the bottom show in measurement 1 the cracks with a sulfur content of 0.051 wt % in the printed state and in the depiction to the right of it in the printed, heat treated state. The image on the left shows a higher porosity and also a few isolated cracks. If this alloy (steel 2) is printed with a platform heating, then the cracks propagate drastically (FIG. 7).

With the invention, though, not only is the sulfur content very low, but also the manganese content is adjusted so that through the adjustment of the manganese content and low sulfur content in combination with the rapid solidification conditions of the 3D printing process, manganese sulfides that diminish the mechanical properties with regard to strength, toughness, and ductility do not form in either the printed state or the printed and heat treated state with the composition according to the invention. In FIG. 2 the structure of the composition according to the invention is shown in the left while on the right, as a comparison example, a 16MnCr5 is shown in which the manganese sulfides are visible.

The manufacture of the material will be explained below.

The steel composition according to the invention is melted in an intrinsically known way in an electric arc furnace or converter and if need be, is adjusted to the alloy composition by means of secondary metallurgy. The steel material obtained in this way is liquefied in a vacuum induction furnace and is atomized in an intrinsically known way in an atomization chamber by means of inert gas atomization (vacuum induction gas atomization). Metal powders can basically also be manufactured by means of water atomization.

Because of the manganese content of the composition according to the invention, the melting preferably takes place in a shielding gas atmosphere and particularly in an argon atmosphere or argon shielding gas atmosphere in order to prevent a vaporization of the manganese. Then the actual atomization process takes place with the aid of a very high gas pressure. In this case, the fireproof crucible is tilted as a result of which the liquid melt flows into a tundish (distributing trough, distributing vessel) and the liquid metal flows out an opening at the bottom of the tundish into a nozzle. The nozzle atomizes the molten metal into fine metal particles that are smaller than 1 mm in size. The metal particles undergo an abrupt cooling and after the atomization, are in a powdered form.

For example, argon or nitrogen can be used as the atomization gas.

The powder obtained in this way then requires processing.

For a corresponding classification of this powder, it is possible to pass the powder through a screen and it is also possible for the powder to be correspondingly classified by means of air classifying in a deflector wheel classifier. Preferably, the size of the powder particles and/or the particle size distribution corresponds to the requirements of the respective additive manufacturing method. For the powder bed method, for example, the desired particle size distribution is for example 15-63 μm (for special applications, narrower limits can also be set), 15-45 μm or 20-53 μm. The lower value here is the D10 value and the upper one is the D90 value.

This size of the powder particles and the desired particle size distributions, as has already been explained above, can be achieved by means of screening; the screening can ensure the classification of the powder by particle size into different powder fractions. The different screening fractions can be combined into a desired particle range if necessary.

In air classifying, the classification is carried out by using different settling rates of different-sized particles in a gas flow. This method is particularly suitable for large quantities of powder; it can also be preceded by a screening.

In air classifying, the cut can be influenced by the gas quantity that is conveyed through the classifier and by the deflector wheel rotation speed.

FIG. 3 shows an example of a possible particle size distribution in the material according to the invention. This particle size distribution is shown in the table according to FIG. 4.

In order to characterize powders of this kind, the particle size, sphericity, and pourability are determined. In particular, an optical analysis and an inspection of the powder by means of SEM images are performed. With particle sizes <20 μm, the powder is particularly suitable for the so-called metal injection molding sintering method and the so-called binder jetting method.

Particle size distributions of 15-63 µm, in particular 15-45 µm, are particularly used in laser powder bed methods (e.g. selective laser melting) or electron beam melting, whereas powders with a size >45 µm are used in the laser metal deposition method and in the direct energy deposition method.

Naturally, such powders can also be used for hot isostatic pressing methods.

Figure 5B:
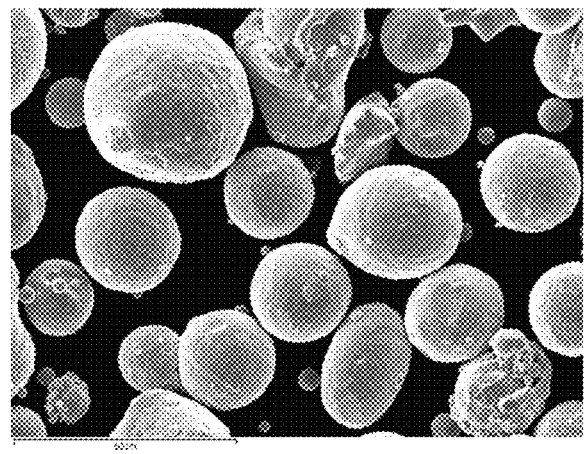

FIGS. 5a and 5b show images with different enlargements of a typical powder produced from the material according to the invention.

The powder obtained in this way is then ready for processing.

The processing in the powder bed method will be explained in greater detail below.

FIG. 6 shows the process window of the material in powder form according to the invention; it is clear that a very wide range of laser energy is possible and also a very large range of laser advancing speed so that this demonstrates in a very striking way that the steel material in powder form according to the invention can be printed in a particularly favorable way so that a broad spectrum of conventional AM or 3D printers can be used without going beyond the range in which very good results are achieved.

Because of the low carbon content of around 0.19 wt %, with the material according to the invention, a powder bed preheating is not necessary, which further simplifies the printing process to a considerable degree.

In the above-mentioned process window according to FIG. 6, there is a very high stability of the porosity of 0.01-0.03%, which likewise demonstrates how well and simply the material according to the invention can be printed.

With the use of a conventional EOS M290 printer, laser powers of for example 200-275 W with a scanning speed of 750-1000 mm/sec, for example 775-1000 mm/sec can be used. Usable layer thicknesses are between 25 and 65 µm, for example between 30 and 60 µm with a line spacing of between 80 and 150 µm, for example 110 µm and a laser focus diameter of between 80 and 120 µm, for example 100 µm. The volume/energy density in this case is between 45 and 85 Joule/mm$^3$, for example between 50 and 75 Joule/mm$^3$ so that the process has very large tolerances, which in turn ensure a simple printability.

With the material according to the invention, no preheating is required. The preheating exhibits a negative effect with the alloy steel 2 because in this case, the high sulfur content results in increased crack formation due to the additional energy input. The additional energy input due to the increase in the laser power can result in the vaporization of the material, weld spatters, and instability of the weld pool (steel 1 and 2).

Through selective printing process parameter variations, it has been possible to demonstrate that based on the parameter window that is already very broadly defined anyway, the increased energy input increases the diffusion of sulfur and thus increases the tendency for sulfur segregation and the crack formation that results from this. The specimens prepared with the above-mentioned "EOS M290" system without a heating of the build chamber were produced as specimens in the as-built or as-printed state, without subsequent heat treatment and in the hardened and tempered state; the hardening temperature was 850° C. in the one instance and 950° C. in the other. Quenching was performed with water. These hardening and tempering treatments comprise a hardening procedure (850° C. or 950°) with a holding time of approx. 30 min. The duration of the subsequent tempering process (200° C.) is 2 hours, followed by cooling in air.

The specimens were also tempered at 200° C. immediately after printing, without a prior hardening. According to FIG. 8, in this case, corresponding mechanical tests were performed in the Z structural direction and in the XY structural direction, which means that the mechanical sampling was performed once in accordance with the advancing progression of the welding bead (XY-structural direction) and once in the welding direction of the successive layers (Z-structural direction).

The prototype steel powder material used—as a low-alloyed steel alloy with the potential for case-hardening—was as follows (steel 1): 0.18% C, 0.29% Si, 0.23% Mn, 0.005% P, 0.0031% S, 0.97% Cr, 0.20% Mo, 1.27% Ni, 0.13% V, as well as residual iron and impurities. A steel with a higher sulfur content and the same composition otherwise was used as a reference (steel 2 with 0.051% S). A comparison to a standard 16MnCr5 was also included.

The mechanical properties were compared to two other materials according to FIG. 9. The tensile test was performed according to DIN EN ISO 6892-1 with the specimen body B02 and method B. The notched bar impact work was determined according to the ASTM E23 notched bar impact test at room temperature and with Charpy V specimens. The hardness in Rockwell C was determined according to ASTM E18-17.

FIGS. 10 and 11 first show the strength values, measured in terms of tensile strength ($R_m$ in MPa) in the printed, but not heat-treated state. In this case, FIG. 10 shows the printed horizontal state, i.e. in the XY direction, and FIG. 11 shows the printed vertical state.

A comparison between steel 1 and steel 2 shows that the tensile strengths $R_m$ do not exhibit any great differences in either the printed horizontal state or the printed vertical state. In both cases, a very high tensile strength of around 1200 MPa can be achieved. In addition, the 0.2% yield strength ($R_{p0.2}$ in MPa) is comparatively high in both steels.

But if the elongation at break (A5 in %) and the contraction at break (Z in %) are taken into account, it is clear that steel 1 is far superior to steel 2. Among other things, this is due to the negative influence of sulfur.

FIGS. 12 and 13 show the above-mentioned examples, but with a subsequent tempering process in addition to the as-printed state. This does not really result in a change to the image; here, too, steel 1 is far superior to steel 2 when it comes to the elongation at break and the contraction at break.

FIGS. 14 and 15 show the comparison of three materials with a hardening after the printing at 850° C. and a subsequent tempering treatment at 200° C. The strength values ($R_m$) in the material according to the invention are in the same range as those of 16MnCr5. With vertically built specimens, the material according to the invention exhibits higher strengths ($R_m$), namely of greater than 1400 MPa. Also with regard to the contraction at break (Z), the material according to the invention outperforms the 16MnCr5 by approx. 20% in vertical specimens. Consequently, with a higher strength, the material according to the invention also has a higher ductility in comparison to the known material. With regard to steel 2 with the higher sulfur content, the material according to the invention exhibits a strength ($R_m$) that is 200 MPa higher. Here, too, the material according to the invention is far superior to the comparison material from the preceding figures in terms of the elongation at break and contraction at break.

The heat treatment or hardening at 950° C. and a subsequent tempering treatment at 200° C. produces an image in the horizontal and vertical state in FIGS. 16 & 17 that is similar to the ones in FIGS. 14 & 15. It is possible, however, to determine that the maximum strength of steel 1 is achieved with a heat treatment that has a hardening temperature of 850° C.

If the toughness is compared, it is clear that although the strength values of steel 2 in the printed state are virtually the same in comparison to steel 1, steel 1 is nevertheless far superior to steel 2 when it comes to toughness. The high notched bar impact work in the printed state is clearly due to the fine grain structure, which is produced by the printing process with its very rapid solidification and on the other hand by the adapted alloy composition, which is optimized for the printing process. In particular, the addition of vanadium to the alloy according to the invention here also has a noticeable effect because it shifts the pearlite region toward longer times such that a more bainitic structure is produced, which promotes toughness. In FIGS. 18 and 19, it is clear that the hardnesses measured in HRc are otherwise the same, whereas the toughness values are strikingly far apart.

FIGS. 20 and 21 show a comparison of the two materials, which have been tempered immediately after the printing. The image is similar to the merely printed state, but the notched bar impact work has decreased somewhat in comparison to the merely printed state. This also strikingly demonstrates that with steel 1, outstanding properties are achieved in a simple way already with the printed material without curing.

FIGS. 22 and 23 show the material comparison, but also include 16MnCr5 in the state in which it has been hardened at 850° C. and tempered at 200° C. In this case, it is clear that the notched bar impact work values ($K_v$ in J) of steel 1 are considerably higher than those of 16MnCr5 and, as has also been already demonstrated above, naturally also in comparison to steel 2.

As is clear from FIGS. 24 and 25, in the 16MnCr5, the notched bar impact work increases when the hardening temperature is increased, which is due to a grain coarsening. The hardness is virtually the same in all of the materials and even the increase in the notched bar impact work in the 16MnCr5 never achieves the outstanding toughness values of steel 1.

FIG. 26 shows an overview of the structure of 16MnCr5 in comparison to the invention (steel 1). Steel 1 (FIG. 26 left pictures) exhibits a martensitic/bainitic structure, which occurs with the addition of vanadium. The grain size is approximately 10 μm. FIG. 26 pictures in the middle shows the structure of the 16MnCr5, which is purely martensitic and the grain size is approx. 20 μm. If the hardening temperature of the 16MnCr5 is increased to 970° C., then a grain coarsening occurs (FIG. 26 right pictures).

FIG. 27 shows the notched bar impact work Kv of the printed component without heat treatment as a function of the sulfur content. The rest of the alloy elements are analogous to those of steel 1 and steel 2. Three specimens of each were tested with a standard deviation of ±10%. By reducing the sulfur content, it was possible to improve the notched bar impact work considerably. At 0.003% S, it was 140 J.

In steel 1, it is advantageous that even without subsequent heat treatment, it already exhibits superior mechanical properties, which are also achievable even in a very wide process window so that this material can be printed with great success by more or less "anyone." It is thus possible to produce not only prototypes, but also near-series quality components or small series of them in a simple way with great success, which is necessary for achieving widespread use of the 3D printing process and also minimizes the costs of such printing processes. With the invention, it is also advantageous that the adjusted alloying state does not cause any change in the component geometry since residual austenite after the printing process is avoided. The unwanted transformation of residual austenite into martensite would lead to a volume increase of 3%. The resulting stresses could lead to component damage.

Due to the adjusted chemical composition, the material can undergo further processing after the printing process and also after reaching the heat-treated state. Other processing methods include, for example, surface treatment methods such as case-hardening, nitriding, and carburizing. Repair welding processes such as the laser deposition method (LMD) or the direct energy deposition method (DED) can also be carried out. The material is also suitable for surface-hardening methods using mechanical impact such as shot peening or deep rolling.

The invention claimed is:

1. A method of manufacturing components out of a steel material, comprising the steps of:
   providing a steel material having the following composition in percent by weight:
   C 0.17-0.23
   Si 0.10-0.80
   Mn 0.15-0.45
   P≤0.03
   S≤0.015
   Cr 0.8-2.0
   Mo 0.15-0.80
   Ni 0.1-2.0
   V 0.1-2.0
   the remainder being iron and inevitable impurities;
   atomizing the steel material to produce powder particles;
   classifying the powder particles by sieving or shifting to achieve a D10 value of at least 15 μm and a D90 value of not more than 45 μm after the classification;
   applying energy to the powder particles to melt the powder particles to form an additively manufactured component.

2. The method of claim 1, whereby the steel material further comprises in percent by weight:
   Nb≤0.5
   W≤1.6
   Cu≤1
   Al≤1
   Co≤1
   Ti≤0.5
   Ta≤0.5
   Zr≤0.5
   N≤0.15
   B≤1
   the remainder being iron and inevitable impurities.

3. The method of claim 1, further comprising the step of using a laser to apply the energy, the laser having a laser power of 200-275 W and a scanning speed of 750-1000 mm/s.

4. The method of claim 1, further comprising the steps of forming successive powder layers and fusing them together, wherein the powder layers each have a thickness of between 25 and 65 μm.

5. The method of claim 1, wherein the laser has a focus diameter between 80 and 120 μm.

6. The method of claim 1, wherein the energy has a volume energy density between 45 and 85 Joule/mm$^3$.

7. The method of claim 1, wherein the energy is applied using selective laser melting, selective laser sintering, laser metal deposition, or direct energy deposition.

8. The method of claim 1, further comprising the steps of subjecting the components to hardening and tempering treatments.

9. The method of claim 8, wherein the components are hardened at 800-950° C. and tempered at 180-220° C.

10. The method of claim 1, wherein the powder particles have a D10 value of at least 20 μm after the classification.

11. A method of making a powdered steel material for use in manufacturing steel components, comprising the steps of:
providing a steel material having the following composition in percent by weight:
C 0.17-0.23
Si 0.10-0.80
Mn 0.15-0.45
P≤0.03
S≤0.015
Cr 0.8-2.0
Mo 0.15-0.80
Ni 0.1-2.0
V 0.1-2.0
the remainder being iron and inevitable impurities;
atomizing the steel material to produce powder particles; and
classifying the powder particles by sieving or shifting to achieve a D10 value of at least 15 μm and a D90 value of not more than 45 μm after the classification.

12. The method of claim 11, whereby the steel material further comprises in percent by weight:
Nb≤0.5
W≤1.6
Cu≤1
Al≤1
Co≤1
Ti≤0.5
Ta≤0.5
Zr≤0.5
N≤0.15
B≤1
the remainder being iron and inevitable impurities.

13. The method of claim 11, wherein the powder particles have a D10 value of at least 20 μm after the classification.

14. A method of manufacturing components out of a steel material, comprising the steps of:
providing a steel material having the following composition in percent by weight:
Nb≤0.5
W≤1.6
Cu≤1
Al≤1
Co≤1
Ti≤0.5
Ta≤0.5
Zr≤0.5
N≤0.15
B≤1
the remainder being iron and inevitable impurities;
atomizing the steel material to produce powder particles;
classifying the powder particles by sieving or shifting to achieve a D10 value of at least 15 μm and a D90 value of not more than 45 μm;
applying energy to the powder particles in a powder fusion bed using a laser to selectively melt the powder particles, forming successive powder layers; and
fusing the successive powder layers to each other.

15. The method of claim 14, wherein the laser has a laser power of 200-275 W and a scanning speed of 750-1000 mm/s.

16. The method of claim 15, wherein the laser is applied using selective laser melting, selective laser sintering, or laser metal deposition.

17. The method of claim 16, wherein the powder layers each have a thickness of between 25 and 65 μm.

18. A method of manufacturing components out of a steel material, comprising the steps of:
providing a steel material having the following composition:
C 0.17-0.23
Si 0.10-0.80
Mn 0.15-0.45
P≤0.03
S≤0.015
Cr 0.8-2.0
Mo 0.15-0.80
Ni 0.1-2.0
V 0.1-2.0
the remainder being iron and inevitable impurities;
atomizing the steel material to produce powder particles;
classifying the powder particles by sieving or shifting;
applying energy to the powder particles to melt the powder particles to form additively manufactured components; and
subjecting the components to hardening and tempering treatments;
wherein the components are hardened at 800-950° C. and tempered at 180-220° C.

* * * * *